United States Patent

Nomura

[15] 3,690,241
[45] Sept. 12, 1972

[54] CAMERA STRUCTURE FOR POSITIONING A PHOTOSENSITIVE COMPONENT

[72] Inventor: Katsuhiko Nomura, Kawagoeshi, Japan

[73] Assignee: Asahi Kogaku Kogyo Kabushiki Kaisha, Tokyo-to, Japan

[22] Filed: March 23, 1971

[21] Appl. No.: 127,240

[30] Foreign Application Priority Data

April 2, 1970 Japan ...................... 45/27434

[52] U.S. Cl. ...................................... 95/42, 95/10 C
[51] Int. Cl. ................................................ G03l 19/12
[58] Field of Search ................................ 95/42, 10 C

[56] References Cited

UNITED STATES PATENTS

| | | | |
|---|---|---|---|
| 3,093,044 | 6/1963 | Lederer | 95/42 X |
| 3,498,193 | 3/1970 | Shimomura et al. | 95/10 C |
| 2,754,735 | 7/1956 | Meyer | 95/42 |

*Primary Examiner*—Samuel S. Matthews
*Assistant Examiner*—E. M. Bero
*Attorney*—Steinberg & Blake

[57] ABSTRACT

A camera which has a structure for determining the position of a photosensitive component capable of responding to light travelling toward a film plane where film is located to be exposed. The photosensitive component normally has a position located directly in front of the film plane in the path of light travelling to the latter for responding to the light intensity so as to participate in the determination of the exposure of film. The photosensitive component is supported for movement between an operative position situated in this path of light an an inoperative position displaced beyond the latter path of light. In response to tripping of the shutter, a transmission operates during the initial part of the shutter-tripping operations, prior to actual opening of the shutter, to displace the photosensitive component to an inoperative position situated beyond the path of light travelling to the film plane, so that during actual exposure the photosensitive component will not block travel of light to the film which is exposed. When the shutter is closed the photosensitive component normally is in its operative position in front of the film plane in the path of light travelling toward the latter.

11 Claims, 5 Drawing Figures

INVENTOR
KATSUHIKO NOMURA

BY
Steinberg and Blake
ATTORNEY

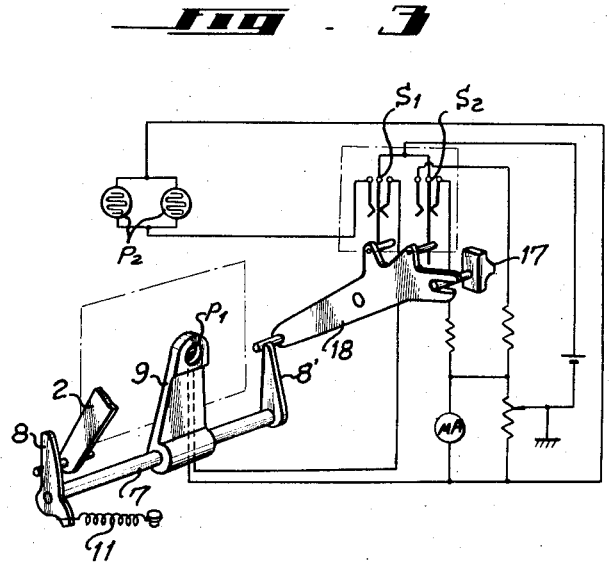
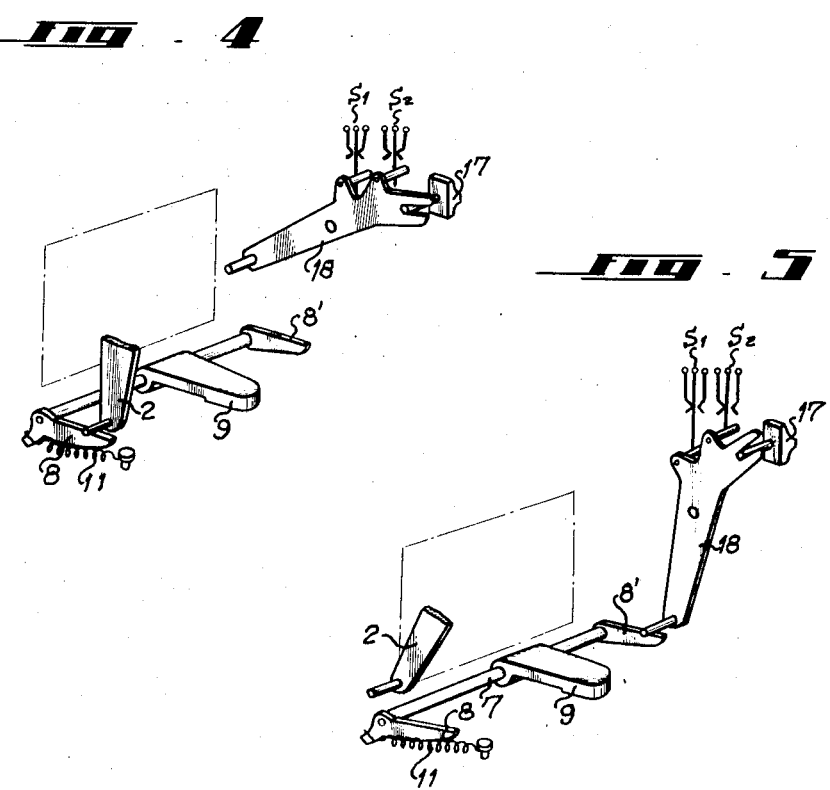
INVENTOR
KATSUHIKO NOMURA
BY Steinberg and Blake
ATTORNEY

CAMERA STRUCTURE FOR POSITIONING A PHOTOSENSITIVE COMPONENT

BACKGROUND OF THE INVENTION

The present invention relates to cameras.

In particular, the present invention relates to that type of camera which has a photosensitive means situated in the path of light which has passed through the objective and is travelling to the film plane for responding to the intensity of this light so as to participate in the determination of the exposure of film.

In order to achieve the highest possible degree of accuracy it is important for the photosensitive means to be situated directly in front of the film plane close to the surface of the film which is subsequently exposed upon opening of the shutter. However, because the photosensitive means is situated directly in front of the film prior to exposure thereof it is essential to move the photosensitive means away from its location in front of the film out of the path of light travelling toward the film plane when the shutter is opened so as to make the actual exposure. With known cameras considerable difficulty has been encountered in providing a structure which will effectively position the photosensitive means beyond the path of light during exposure and in the path of light during preparation for an exposure.

Another problem which has been encountered in cameras of this general type results from the fact that the photosensitive element directly in front of the film plane provides primarily a spot-type of light measurement where a small part of the light from the object which is to be photographed is used to determine the exposure. Under certain conditions it is highly desirable to obtain a more average type of light measurement in accordance with light which is spread over the entire object. This latter type of measurement is not possible with the highly localized light-measurement resulting from a photosensitive element situated directly in front of the film plane.

SUMMARY OF THE INVENTION

It is accordingly a primary object of the present invention to provide for a camera of the above general type a mechanism which will operate in a highly effective manner to bring about the required movement of a photosensitive means to and from its operative position situated directly in front of the film plane.

Thus, it is an object of the invention to provide a simple, highly reliable, and extremely effective mechanism which in response to actuation of the shutter will operate during the initial part of the shutter-tripping operations, prior to actual opening of the shutter, to displace the photosensitive means to a location beyond the path of light travelling to the film plane, while at the same time the mechanism is capable of restoring the photosensitive means back to its operative position when the shutter is again closed.

Furthermore, it is an object of the present invention to provide an exceedingly simple structure for accomplishing these results with this structure occupying only a small amount of space and responding only to normal camera operation to bring about the determining of the position of the photosensitive means.

It is also an object of the present invention to provide a manually operable structure, available to the operator, for permanently holding the photosensitive means in an inoperative position at the will of the operator. It is furthermore an object of the present invention to provide a structure of this latter type which will automatically render operative a second photosensitive means capable of responding to a wider, more average light than the photosensitive means in front of the film plane with this second photosensitive means becoming operative when the manually operable means is actuated by the operator to maintain the first photosensitive means beyond the path of light travelling to the film plane.

According to the invention the camera has a film plane in which the film is located during exposure, a photosensitive means being provided for responding to light intensity and for participating in the determination of the extent to which film is exposed. A support means supports the photosensitive means for movement between an operative position situated directly in front of the film plane in the path of light travelling to the film plane for exposing film during subsequent opening of a shutter of the camera and an inoperative position displaced beyond this path of light. A shutter-tripping means is movable along a predetermined path for tripping the camera shutter so as to open the latter and make the exposure. This shutter-tripping means is movable along the latter path through an initial increment prior to actual tripping of the shutter. A positioning means coacts with the shutter-tripping means and with the support means for responding to movement of the shutter-tripping means through its initial increment in order to position the photosensitive means in its inoperative position. This positioning means coacts with the support means for normally maintaining the photosensitive means in its operative position prior to actuation of the shutter-tripping means.

BRIEF DESCRIPTION OF DRAWINGS

The invention is illustrated by way of example in the accompanying drawings which form part of this application and in which:

FIG. 3 is a partly perspective schematic representation of part of the structure of FIG. 1 and additional structure which may be combined therewith for rendering the photosensitive means in front of the film plane inoperative at the will of the operator as well as for selectively rendering a second photosensitive means operative when the first photosensitive means is rendered inoperative;

FIG. 4 is a fragmentary perspective illustration schematically illustrating the position of the parts when a manually operable means of FIG. 3 is in its rest position with the photosensitive means normally in front of the film plane shown in FIG. 4 displaced beyond the path of light travelling to the film plane; and FIG. 5 shows the parts of FIG. 4 in the position they take when the manually operable means has been actuated to maintain the photosensitive means which normally is located in front of the film plane in its inoperative position situated beyond the path of light travelling to the film plane.

DESCRIPTION OF PREFERRED EMBODIMENTS

The description which follows refers to a single-lens reflex camera, and the drawings illustrate the structure of the invention in connection with such a camera, although it is possible to use the structure of the invention in other types of cameras. Thus, the drawings and description relate to movement of a photosensitive means from an operative position in front of the film plane in a single-lens reflex camera to an inoperative position situated beyond the path of light travelling to the film plane, this movement of the photosensitive means to the inoperative position taking place simultaneously with the swinging of a mirror out of the path of light travelling to the film plane during the initial part of the shutter-tripping operations, as is well known in single-lens reflex cameras. In addition, particularly in connection with FIGS. 3–5, there is an illustration of a manually operable means capable of maintaining the photosensitive means in its inoperative position at the will of the operator while also capable of assuming a rest position where the photosensitive means will move to and from its operative position in response to shutter actuation.

Figure 1:
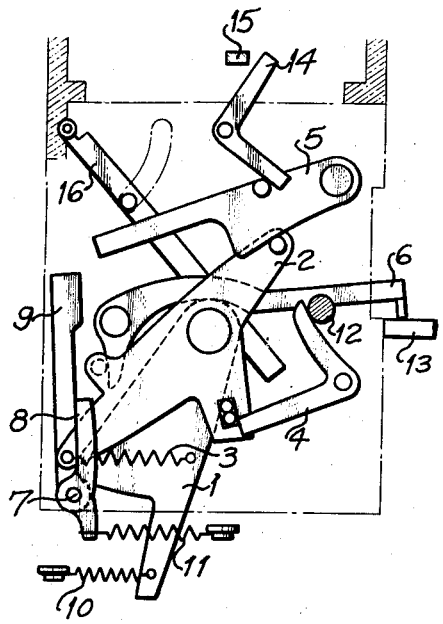
FIG. 1 is a schematic side elevation of a mechanism according to the invention, this mechanism being shown in FIG. 1 in the position it takes prior to actual exposure.
Figure 2:
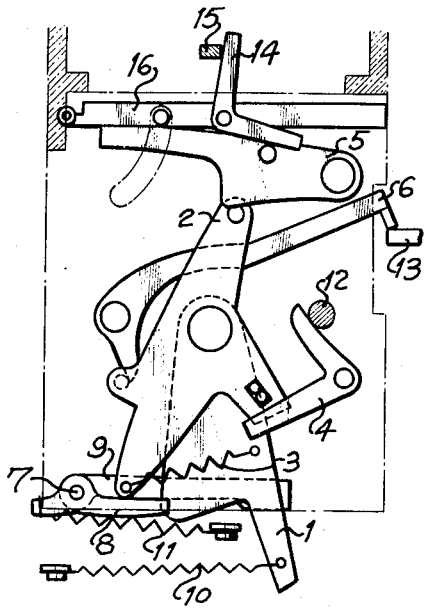
FIG. 2 illustrates the parts of FIG. 1 in the position assumed thereby during exposure.

Referring now to FIGS. 1 and 2 there is schematically represented therein a mechanism according to the invention associated with a single-lens reflex camera. The illustrated structure includes a conventional mirror-controlling lever 1 which is swingably supported at its upper end on any suitable stationary pin. This lever 1 normally assumes the position shown in FIG. 1. It is maintained in this latter position by a spring 10, as schematically represented in FIG. 1. During the shutter cocking operations, the lever 1 is turned in a known way from the position of FIG. 1 into the position of FIG. 2, in opposition to the spring 10.

A positioning means of the invention includes a transmission which is formed in part by a swingable lever 2 which is coaxial with the lever 1 and supported, for example, by the same pin for swinging movement about the axis about which the lever 1 swings. This transmission includes a spring 3 connected at one end to the lever 2 and at an opposite end to the lever 1 so as to urge the transmission lever 2 to turn in a counter-clockwise direction from the position of FIG. 1 to the position of FIG. 2. The transmission lever 2 has a number of arms extending from its axis, and one of these arms carries a projection which coacts with a blocking lever 4 of the transmission which forms part of the positioning means of the invention. This blocking lever 4 has the configuration of a bell crank and is shown in FIG. 1 in its blocking position engaging a projection of the lever 2 so as to prevent the latter from being turned to the position of FIG. 2. At its upper end the lever 2 carries a pin which coacts with a swingable mirror lever 5 which is supported for swinging movement on a stationary pin situated at the right end of the lever 5 as viewed in FIGS. 1 and 2. The mirror lever 5 has a lower camming edge engaged by a pin which projects from the top end of the lever 2.

A further arm of the lever 2 carries a pin which controls the position of a diaphragm lever 6. This lever 6 is supported for swinging movement at the region of its left end, as viewed in FIGS. 1 and 2, and at the region of its left end the diaphragm lever 6 has a downwardly extending arm engaging the pin which projects from the lever 2. At its right end, as viewed in FIGS. 1 and 2, the diaphragm lever 6 cooperates in a conventional manner with a diaphragm-controlling element 13. When this element 13 is maintained by the lever 6 in the position of FIG. 1 the diaphragm is in its fully open position enabling the object which is to be photographed to be viewed directly through the objective of the single-lens reflex camera. In the position of FIG. 2 the raised lever 6 permits element 13 to move so that the diaphragm can be stopped down to the aperture required for a proper exposure, as is well known in the art.

In accordance with the invention the transmission lever 2 has at its lower end a pin coacting with an arm of a spring lever 8 which forms part of the transmission of the positioning means. This spring lever 8 is fixed to a rotary shaft 7 which is supported in any suitable bearings for rotation about its axis. As is apparent particularly from FIGS. 4 and 5, where the part of the film plane through which the film is actually exposed is shown in phantom lines, the rotary shaft 7 extends beneath the aperture through which the film is exposed so that the shaft 7 is situated beyond the path of light traveling to the film to expose the latter. Thus, the shaft 7 is situated just beneath and extends along the lower edge of the film aperture.

This rotary shaft 7 fixedly carries a carrier arm 9 and forms with the latter a support means for supporting a photosensitive means $P_1$ (FIG. 3) for movement between the operative position illustrated in FIG. 3 where the photosensitive means $P_1$ is situated directly in front of the film plane in the path of light travelling to the film plane to expose film therein during subsequent opening of the shutter. It will be noted that the arm 9 of the support means covers only a relatively small portion of the area which is exposed upon opening of the shutter and locates the photosensitive means $P_1$ in close proximity to the film plane, so that the condition of the light reaching this photosensitive means closely approximates the condition of the light during actual exposure. The support means 7,9 supports the photosensitive means $P_1$ for movement from this operative position illustrated in FIG. 1 to the inoperative position illustrated in FIGS. 4 and 5 where the carrier arm 9 extends horizontally from the shaft 7 so as to locate the photosensitive means $P_1$ downwardly below the path of light travelling to the film to expose the latter. Thus, when the photosensitive means $P_1$ is in its operative position shown in FIG. 3 it is situated directly in front of the aperture, indicated in phantom lines in FIG. 3, through which the film is subsequently exposed.

Thus, the positioning means which acts on the support means 7, 9 includes the transmission made up of the transmission lever 2 and the arm of spring lever 8 with which the transmission lever 2 coacts, this transmission of the positioning means further including the blocking lever 4. The positioning means for acting on the support means 7, 9 to determine the position of the photosensitive means $P_1$ also includes the spring 11 which is operatively connected with the spring lever 8, which is fixed to the shaft 7, so as to normally maintain the photosensitive means $P_1$ in its operative position shown in FIG. 3. Of course the photosensitive means $P_1$ is also in its operative position in FIG. 1 where the support means 7, 9 is positioned by the positioning means in such a way that the carrier arm 9 extends upwardly from the rotary shaft 7. The spring 11 of the positioning means is connected at one end to a downwardly extending arm of the lever 8, as viewed in FIG. 1, and at its opposite end to a stationary pin of the camera.

A shutter-tripping means 12 is provided for tripping the shutter of the camera so as to make an exposure. This shutter-tripping means 12 includes the sectionally illustrated element shown in FIGS. 1 and 2 engaging the upper arm of the blocking lever 4. In FIG. 1 this shutter-tripping means 12 is shown in an upper starting position. When the shutter is to be tripped in order to make an exposure a button which is available to the operator of the camera is depressed and the means 12 illustrated in FIGS. 1 and 2 is displaced downwardly from the position of FIG. 1 to the position of FIG. 2. During the initial increment of the path of movement of the shutter-tripping means 12 it acts on the blocking lever 4 to turn the latter in a counterclockwise direction, as viewed in FIG. 1, from the position of FIG. 1 to the position of FIG. 2, thus releasing the transmission lever 2 so that it will be turned by the spring 3 to the position shown in FIG. 2. This operation which takes place during the initial increment of movement of the shutter-tripping means results in a manner described below in displacement of the photosensitive means to its inoperative position situated beyond the path of light travelling to the film plane, so that during the subsequent opening of the shutter the path of light travel is not interrupted by the photosensitive means $P_1$ or the carrier arm 9 of the support means.

The tiltable mirror of the single-lens reflex camera is carried by a surrounding frame 16 which is supported for swinging movement at its left end, as viewed in FIG. 1. A pin which projects from the frame 16 is engaged by the upper edge of the mirror lever 5. This lever 5 carries a pin which engages a bell crank 14 schematically represented in FIGS. 1 and 2. The bell crank 14 is supported for swinging movement about a stationary pin. When the lever 5 is swung upwardly from the position of FIG. 1 to the position of FIG. 2 by camming at the lower edge of the lever 5 with the pin which projects from the top end of the lever 2, when the latter swings from the position of FIG. 1 to the position of FIG. 2, not only does the lever 5 act on the frame 16 to swing the mirror upwardly beyond the path of light travel to the film but also the bell crank 14 is swung from the position of FIG. 1 to the position of FIG. 2 in order to engage the shutter control element 15 which is moved so as to release the shutter and cause the actual exposure to be made.

The mirror which is carried by and surrounded by the frame 16 is semi-transparent so that light will be reflected by the mirror upwardly to the viewfinder and at the same time light will travel through the mirror to the photosensitive means $P_1$ when the latter is in its operative position.

The positioning means formed by components 2–4, 8, and 11 and the support means formed by components 7 and 9 thus form a pair of means for determining the position of the photosensitive means $P_1$. This structure which is illustrated in FIGS. 1 and 2 can have added thereto a manually operable means which acts on one of this pair of means for manually holding the photosensitive means $P_1$ in its inoperative position. The manually operable means is illustrated in FIGS. 3–5. It includes a swingable lever 18 as well as a lever 8' fixed to the shaft 7 and a selecting button 17 accessible to the operator at the exterior of the camera. The lever 18 of the manually operable means is supported for turning movement on any suitable pin which is located between the ends of the lever 18. At its lower end the lever 18 carries a pin which extends over the lever 8' which is fixed to the shaft 7 and extends therefrom at the same angle as the carrier arm 9 and the spring lever 8. This lever 18 of the manually operable means is shown in its rest position in FIGS. 3 and 4. In this rest position the lever 18 will have no influence on the operation of the support means 7, 9. However, when the lever 18 is swung to the position of FIG. 5, the pin projecting from the bottom end of lever 18 engages the upper edge of the lever 8' to prevent the shaft 7 from being turned back to the position of FIG. 3 by the spring 11, so that in this way the photosensitive means $P_1$ is manually maintained in its inoperative position. At its upper end the lever 18 has a notch receiving a pin fixed to the vertically movable button 17. When this button is moved down to the position of FIG. 4 the lever 18 is raised to its rest position. When the button 17 is moved up to the position of FIG. 5 the lever 18 is in its operative position holding the lever 8' at an angle which will prevent the photosensitive means $P_1$ from being returned to its operative position. Any suitable structure may be provided, if required, to releasably hold the button 17 respectively in the positions of FIGS. 4 and 5.

Thus, with the structure shown in FIGS. 3 and 5 the manually operable means acts on the support means to maintain the photosensitive means $P_1$ selectively in its inoperative position.

The photosensitive means $P_1$ responds only to a relatively small part of the light used subsequently to expose the film, so that it provides an essentially spot-type of measurement for determining the extent of exposure. Under certain conditions it is desired to measure light over a larger area so as to provide a more average determination of light intensity, depending upon the particular type of object which is photographed. For this purpose a second photosensitive means $P_2$ is provided. This second photosensitive means which is illustrated in FIG. 3 is situated at the region of the viewfinder for example at the exit plane of a pentaprism of the single-lens reflex camera. The pair of photosensitive means $P_1$ and $P_2$ are located in an electrical circuit which is illustrated in FIG. 3. This circuit includes a pair of change-over switches $S_1$ and $S_2$. These switches normally assume the position illustrated in FIGS. 3 and 4 where the photosensitive means $P_1$ is rendered operative while the photosensitive means $P_2$ is inoperative. However, when the button 17 is moved up to the position of FIG. 5 so as to cause the manually operable means to maintain the photosensitive means $P_1$ in its inoperative position, the switches $S_1$ and $S_2$ are actuated so as to assume the position indicated in FIG. 5. This is brought about by pins projecting from the lever 18 and insulated therefrom, these pins displacing the switches to positions illustrated in FIG. 5 where they locate the photosensitive means $P_2$ in the circuit so as to render the latter photosensitive means operative, while at the same time disconnecting the photosensitive means $P_1$ from the circuit, so that the latter photosensitive means is rendered inoperative simultaneously with actuation of the manually operable means to maintain the photosensitive means $P_1$ in its inoperative position, and at the same time the photosensitive means $P_2$ is rendered operative.

When operations in preparation for an exposure are carried out, the structure has the position shown in FIGS. 1 and 3. The transmission lever 2 has returned to the position of FIG. 1 after the previous exposure simultaneously with the return of the lever 1 to the position of FIG. 1 by the spring 10. The blocking lever 4 thus holds the transmission lever 2 in the position of FIG. 1. Subsequently, the shutter is cocked simultaneously with film transport to locate the next unexposed film frame at the exposure position in the film plane at the aperture shown in phantom lines in FIGS. 3–5. The return of the lever 2 to the position of FIG. 1 permits the spring 11 of the positioning means to act on the support means 7, 9 to restore the photosensitive means $P_1$ to its operative position. Thus the light travelling toward the film plane will at this time impinge on the photosensitive means $P_1$ after having passed through the objective and the semi-transparent mirror with the operator viewing the object through the viewfinder to which light is reflected by the mirror which is carried by the frame 16. Thus the photosensitive means $P_1$ will detect at a position very close to the surface of the film which is to be exposed the light intensity corresponding entirely or partially to the image which is to be focussed on the surface of the film during the actual exposure.

The operator views the image through the viewfinder with the light reflected from the mirror so as to carry out the necessary preparatory operations in a manner which is fully conventional with single-lens reflect cameras. An electrical circuit which includes a suitable exposure meter and the photosensitive means $P_1$ is incorporated in the camera and will function in a known manner to provide an automatic determination of the exposure. For example the exposure time may be automatically determined in this way while the operator selects a given diaphragm aperture to which the diaphragm will automatically stop down upon raising of the lever 6. Thus, when the exposure is to be made the operator will depress the shutter button so as to move the shutter-tripping means 12 downwardly, thus swinging the blocking lever 4 so as to release the transmission lever 2. during the transport of the film and the cocking of the shutter the lever 1 is swung in a known way to the position of FIG. 2, so that the spring 3 is tensioned at this time, and thus upon turning of the blocking lever 4 during the initial increment of movement of the shutter-tripping means 12, before the actual opening of the shutter, the lever 2 will be swung by the spring 3 from the position of FIG. 1 to the position of FIG. 2, thus raising the diaphragm lever 6 so that the diaphragm will stop down to the selected aperture while the frame 16 snaps upwardly out of the light path in response to upward swinging of the lever 5 in the manner described above.

This swinging of the lever 2 at this time causes the spring lever 8 to be swung in opposition to the spring 11 from the position of FIG. 1 to the position of FIG. 2 so that the photosensitive means $P_1$ is lowered to its inoperative position situated beyond the path of light travelling to the film.

During the final part of the movement of the shutter-tripping means 12 the lever 14 will be swung into engagement with the tripping lever 15 so as to bring about the actual tripping of the shutter after the parts have assumed the position shown in FIG. 2. Thus the proper exposure of the film is achieved with the mirror and the photosensitive means $P_1$ both retracted beyond the path of light, and after completion of the shutter release the shutter will automatically close after a given exposure time has elapsed and the parts will then return to the position of FIG. 1.

With the embodiment of FIGS. 3–5 the lever 8' is acted upon by the lever 18 in the same way that the lever 8 is acted upon by the lever 2. Thus, with the position of the parts shown in FIGS. 3 and 4 the manually operable means does not participate in the operation. On the other hand, when the manually operable means has the position of FIG. 5 the transmission lever 2 as well as the spring 3 and the blocking lever 4 of the positioning means will function but will have no effect on the photosensitive means $P_1$ because the lever 8 is maintained in the position shown in FIG. 5. At this time the manually operable means acts on the lever 8' and also acts on the switches $S_1$ and $S_2$ so as to render the photosensitive means $P_1$ inoperative while at the same time rendering the photosensitive means $P_2$ operative. The photosensitive means $P_2$ is situated, for example, in the path of the viewfinder light so that light from a relatively wide range of the scene which is photographed reaches and impinges on the photosensitive means $P_2$ so as to provide a more average light measurement, as contrasted with a localized spot-type of light measurement which would be achieved with the photosensitive means $P_1$.

Thus, the spring 11 of the positioning means normally acts on the support means 7, 9 to maintain the photosensitive means $P_1$ in its operative position. During the initial increment of movement of the shutter-tripping means 12 this photosensitive means $P_1$ is swung beyond the path of light travelling to the film plane. The location of the photosensitive means $P_1$ close to the film surface permits a localized light intensity of the photographed image to be determined as an equivalent of the photograph image, and the retraction of the photosensitive means $P_1$ beyond the path of light before actual opening of the shutter assures an exposure free from any undesirable effect resulting from interruption of the light by the photosensitive means $P_1$. In addition it will be noted that the manually operable means 8', 18 enables the photosensitive means $P_1$ to be maintained in its inoperative position without interfering in any way with the normal functioning of the camera. Furthermore, the actuation of the manually operable means will render the photosensitive means $P_2$ operative so that it is possible with the camera of the invention to change over between a spot-type of photometry with the photosensitive means $P_1$ and an average photometry with the photosensitive means $P_2$ in accordance with the conditions under which a given exposure is made.

What is claimed is:

1. In a camera having a film plane in which film is located during exposure, photosensitive means for responding to light intensity and for participating in the determination of the extent to which film is exposed, support means supporting said photosensitive means for movement between an operative position situated directly in front of the film plane in the path of light travelling to the film plane for exposing film during subsequent opening of a shutter of the camera and an inoperative position displaced beyond said path of light, said support means when supporting said photosensitive means in said operative position thereof covering only a small fraction of the area exposed to light when the shutter opens and situating said photosensitive means in close proximity to the film plane so that the condition of the light reaching said photosensitive means closely approximates the condition of the light to which film is subsequently exposed, shutter-tripping means movable along a predetermined path for tripping the camera shutter so as to open the latter and make an exposure, said shutter-tripping means being movable along said path of movement through an initial increment prior to actual tripping of the shutter, and positioning means coacting with said shutter-tripping means and said support means for responding to movement of said shutter-tripping means through said initial increment to position said photosensitive means in said inoperative position thereof, said positioning means coacting with said support means for normally maintaining said photosensitive means in said operative position thereof prior to actuation of said shutter-tripping means.

2. The combination of claim 1 and wherein said positioning means includes a spring operatively connected with said support means for acting on the latter to hold said photosensitive means normally in said operative position thereof, said positioning means further including a transmission actuated by said shutter-tripping means and acting on said support means in opposition to said spring for displacing said photosensitive means to said inoperative position thereof upon movement of said shutter-tripping means through said initial increment of said path of movement thereof.

3. In a camera having a film plane in which film is located during exposure, photosensitive means for responding to light intensity and for participating in the determination of the extent to which film is exposed, support means supporting said photosensitive means for movement between an operative position situated directly in front of the film plane in the path of light travelling to the film plane for exposing film during subsequent opening of a shutter of the camera and an inoperative position displaced beyond said path of light, shutter-tripping means movable along a predetermined path for tripping the camera shutter so as to open the latter and make an exposure, said shutter-tripping means being movable along said path of movement through an initial increment prior to actual tripping of the shutter, and positioning means coacting with said shutter-tripping means and said support means for responding to movement of said shutter-tripping means through said initial increment to position said photosensitive means in said inoperative position thereof, said positioning means coacting with said support means for normally maintaining said photosensitive means in said operative position thereof prior to actuation of said shutter-tripping means, said positioning means including a spring operatively connected with said support means for acting on the latter to hold said photosensitive means normally in said operative position thereof, said positioning means further including a transmission actuated by said shutter-tripping means and acting on said support means in opposition to said spring for displacing said photosensitive means to said inoperative position thereof upon movement of said shutter-tripping means through said initial increment of said path of movement thereof, said support means including a rotary shaft situated beyond said path of light and a carrier arm fixed to said shaft and carrying said photosensitive means, so that the latter turns with said rotary shaft, and a spring lever fixed to said shaft and said spring for normally positioning said photosensitive means in said path of light.

4. The combination of claim 3 and wherein said spring lever has an arm projecting from said shaft, and said transmission including one of said arms and a transmission lever engaging said one arm for turning said shaft in opposition to said spring upon movement of said shutter-tripping means through said initial increment.

5. The combination of claim 4 and wherein said transmission includes a second spring acting on said transmission lever for urging the latter to turn said one arm and said shaft in opposition to said first-named spring, and said transmission also including a blocking lever normally blocking said transmission lever from being turned by said second spring, said shutter-tripping means during said initial increment of movement thereof displacing said blocking lever to a non-blocking position releasing said transmission lever for movement by said second spring.

6. The combination of claim 5 and wherein said transmission lever coacts with said arm of said spring lever.

7. The combination of claim 1 and wherein said support means and said positioning means form a pair of means for determining the position of said photosensitive means, and manually operable means coacting with one of said pair of means for manually positioning said photosensitive means in said inoperative position thereof.

8. The combination of claim 7 and wherein said manually operable means coacts with said support means for acting on the latter independent of said positioning means to locate said photosensitive means in said inoperative position thereof.

9. The combination of claim 8 and wherein said support means includes a rotary shaft and a carrier arm fixed to said rotary shaft and carrying said photosensitive means, said manually operable means including a lever fixed to said shaft and a manually movable member coacting with said lever for acting on the latter to maintain said photosensitive means in said inoperative position, said manually movable member having a rest position freeing said support means to control by said positioning means.

10. The combination of claim 8 and wherein a second photosensitive means is situated at a location beyond the path of light travelling to the film plane for providing a different light measurement, said manually operable means having a rest position freeing said support means for control by said positioning means and rendering said first-named photosensitive means operative and said second photosensitive means inoperative, said manually operable means when situating said first-named photosensitive means in said inoperative position thereof rendering said first-named photosensitive means inoperative while simultaneously rendering said second photosensitive means operative.

11. The combination of claim 1 and wherein said camera is a single lens reflex camera having a mirror swingable about a given axis, said support means supporting said photosensitive means for swinging movement about an axis situated beneath said given axis.

* * * * *